US012597580B2

(12) United States Patent
Wang

(10) Patent No.: US 12,597,580 B2
(45) Date of Patent: Apr. 7, 2026

(54) X-RAY GENERATING APPARATUS AND IMAGING DEVICE

(71) Applicant: Siemens Healthcare GmbH, Erlangen (DE)

(72) Inventor: Xiao Xing Wang, Wuxi (CN)

(73) Assignee: Siemens Healthineers AG, Forchheim (DE)

( * ) Notice: Subject to any disclaimer, the term of this patent is extended or adjusted under 35 U.S.C. 154(b) by 252 days.

(21) Appl. No.: 18/552,274

(22) PCT Filed: Mar. 24, 2022

(86) PCT No.: PCT/EP2022/057754

§ 371 (c)(1),
(2) Date: Sep. 25, 2023

(87) PCT Pub. No.: WO2022/207446

PCT Pub. Date: Oct. 6, 2022

(65) Prior Publication Data

US 2024/0194436 A1 Jun. 13, 2024

(30) Foreign Application Priority Data

Apr. 1, 2021 (CN) ......................... 202110357831.4
Apr. 1, 2021 (CN) ......................... 202120674817.2

(51) Int. Cl.
*H01J 35/10* (2006.01)

(52) U.S. Cl.
CPC .......... *H01J 35/106* (2013.01); *H01J 35/104* (2019.05)

(58) Field of Classification Search
CPC ........ H01J 35/10; H01J 35/104; H01J 35/106; H01J 2235/1204; H01J 2235/1266
See application file for complete search history.

(56) References Cited

U.S. PATENT DOCUMENTS 3,610,984 A * 10/1971 Seki ........................ H01J 35/10 378/115
4,167,671 A 9/1979 Boden et al.
(Continued)

FOREIGN PATENT DOCUMENTS

CN 203882951 U 10/2014
CN 214505434 U 10/2021
(Continued)

OTHER PUBLICATIONS

Machine English Language Translation of WO-2015181269-A1 (Dec. 3, 2015) (Year: 2015).*
Sep. 8, 2022 (PCT) International Search Report.

*Primary Examiner* — Jurie Yun
(74) *Attorney, Agent, or Firm* — Banner & Witcoff, Ltd.

(57) ABSTRACT

An X-ray generating apparatus and an imaging device. The X-ray generating apparatus includes: a casing; a heat-conduction member, the heat-conduction member being arranged to run through the casing, and a through-channel being provided in the interior of the heat-conduction member, the through-channel being configured to circulate a cooling medium; an anode target, the anode target being configured to receive electron bombardment in order to generate X-rays, and the anode target is arranged in the casing and surrounding the heat-conduction member in a rotatable fashion. The imaging device includes a cooling system and an X-ray generating apparatus. The cooling system is in communication with two ends of the heat-conduction member, and the cooling system is configured to convey a cooling medium into the heat-conduction member.

13 Claims, 16 Drawing Sheets

(56) References Cited

U.S. PATENT DOCUMENTS

| | | | | |
|---|---|---|---|---|
| 2004/0234033 | A1 | 11/2004 | Anno et al. | |
| 2005/0074094 | A1* | 4/2005 | Jen .......................... | A61B 6/032 378/134 |
| 2005/0089144 | A1 | 4/2005 | Fukushima et al. | |
| 2010/0166141 | A1* | 7/2010 | Vermilyea ............... | H01J 35/10 378/19 |

FOREIGN PATENT DOCUMENTS

| | | | | |
|---|---|---|---|---|
| DE | 202014011302 | U1 | 2/2019 | |
| EP | 1432005 | A1 | 6/2004 | |
| JP | 2016071991 | A | 5/2016 | |
| WO | WO-2015181269 | A1 * | 12/2015 | .............. H01J 35/06 |

* cited by examiner

X-RAY GENERATING APPARATUS AND IMAGING DEVICE

TECHNICAL FIELD

The present disclosure relates to the technical field of X-ray imaging, in particular, to an X-ray generating apparatus and an imaging device.

BACKGROUND

X-rays have advantages such as short wavelength, high energy, and high penetrating power and are widely used in medical imaging equipment. Currently, an X-ray generating apparatus in the related art comprises an anode target and a cathode. When energized, a filament of the cathode can produce thermal electrons. Under the driving action of a high voltage between the cathode end and the anode end, the electrons move at high speed and strike the surface of the anode target, generating X-ray radiation. The X-rays are emitted through a window, and less than 1% of the energy of the high-speed electrons is converted to X-ray energy; all of the remaining energy is converted to thermal energy.

SUMMARY

A first aspect of embodiments of the present disclosure provides an X-ray generating apparatus, comprising: a casing; a heat-conducting member, the heat-conducting member being arranged to run through the casing, and a through-channel being provided in the interior of the heat-conducting member, the through-channel being configured to circulate a cooling medium; an anode target, the anode target being configured to receive electron bombardment to generate X-rays, and the anode target being arranged in the casing and surrounding the heat-conducting member in a rotatable fashion.

A second aspect of embodiments of the present disclosure provides an imaging device, comprising a cooling system and an X-ray generating apparatus as described above; the cooling system is in communication with two ends of the heat-conducting member of the X-ray generating apparatus, and the cooling system is configured to convey a cooling medium into the heat-conducting member.

In the X-ray generating apparatus provided in embodiments of the present disclosure, the heat-conducting member is configured to run through the anode target and the casing, with the through-channel being provided in the interior of the heat-conducting member, and the cooling medium being able to carry away heat from the anode target through the through-channel; as a result, the heat dissipation efficiency of the X-ray generating apparatus is increased, and the service life of the X-ray generating apparatus is improved.

The imaging device provided in embodiments of the present disclosure has the X-ray generating apparatus with high heat dissipation efficiency. Thus, the imaging device's operating stability and service life are increased.

BRIEF DESCRIPTION OF THE DRAWINGS

Embodiments of the present disclosure are described below with reference to the accompanying drawings to give those skilled in the art a clearer understanding of the abovementioned and other features and advantages of the present disclosure. In the drawings.

Key to the figures.

Figure 1:
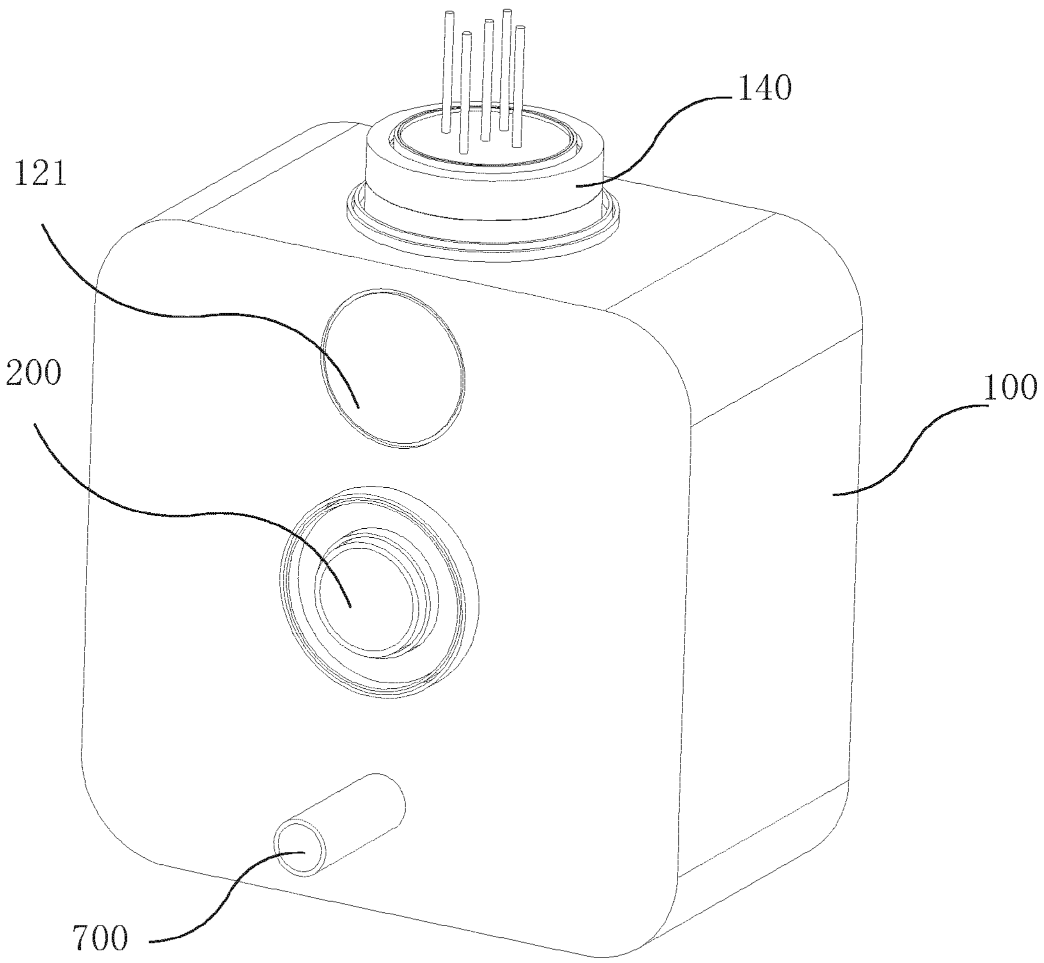
FIG. 1 is a schematic structural drawing, viewed from an X-ray emission side, of an X-ray generating apparatus according to an exemplary embodiment of the present disclosure.

| | |
|---|---|
| 100: casing; | 110: housing; |
| 111: bottom wall | 112: sidewall; |
| 120: cover; | 121: first transmission part; |
| 122: second transmission part; | 130: anode glass bulb; |
| 131: anode glass bulb body; | 132: first anode Kovar ring; |
| 133: second anode Kovar ring; | 140: cathode glass bulb; |
| 141: cathode glass bulb body; | 142: first cathode Kovar ring; |
| 143: second cathode Kovar ring; | 200: heat-conducting member; |
| 210: through-channel; | 220: first bearing; |
| 230: first connecting member; | 240: second bearing; |
| 250: second connecting member; | 260: third bearing; |
| 270: first segment; | 280: second segment; |
| 290: transitional segment; | 300: anode target; |
| 310: first surface; | 400: first cathode; |
| 410: ceramic core; | 420: cathode shielding tube; |
| 430: cathode flat plate; | 440: cathode head; |
| 450: lead; | 500: rotor; |
| 600: second cathode; | 700: gas discharge tube; |
| 800: insulating member; | 810: intermediate body; |
| 820: first sealing ring; | 830: second sealing ring. |

DETAILED DESCRIPTION

To enable a clearer understanding of the technical features, objectives, and effects of the present disclosure, particular embodiments of the present disclosure are now explained with reference to the accompanying drawings, in which identical labels indicate identical parts.

As used herein, “schematic” means “serving as an instance, example, or illustration.” No drawing or embodiment described herein as “schematic” should be interpreted as a more preferred or advantageous technical solution.

To make the drawings appear uncluttered, only those parts relevant to the present disclosure are shown schematically in the drawings; they do not represent the actual structure thereof as a product. Furthermore, to make the drawings appear uncluttered for ease of understanding, in the case of components having the same structure or function in certain drawings, only one is drawn schematically or marked.

In this text, “a” does not only mean “just this one”; it may also mean “more than one.” As used herein, “first” and “second,” etc., are merely used to differentiate between parts, not to indicate their order, degree of importance, or any precondition of mutual existence.

X-rays have advantages such as short wavelength, high energy, and high penetrating power and are, therefore, widely used in medical imaging equipment. Generally, X-rays are generated by high-speed electrons bombarding a rotating anode target. Because less than 1% of the energy of the high-speed electrons is converted to X-ray energy, with all of the remaining energy being converted to thermal energy, a large amount of heat will be produced in the process of X-ray generation. If the heat cannot be promptly dissipated, the anode target will be penetrated due to bombardment and melt.

In the related art, an X-ray generating apparatus comprises an apparatus casing and an anode made of metal. The anode is rotatably arranged in the apparatus casing, and a bearing is provided between the anode and the apparatus casing. An inner ring of the bearing is connected to the anode, an outer ring of the bearing is connected to the apparatus casing, and balls are provided between the inner ring and outer ring of the bearing.

When the anode rotates at high speed, heat dissipation mainly relies on the outward radiation of heat by the anode and the transfer of heat to the apparatus casing through contact heat conduction between the balls of the bearing and the inner/outer rings of the bearing.

However, the speed of thermal radiation conduction is slow, and the area of contact between the balls and the bearing inner/outer rings is small, so not much heat relies on bearing heat conduction; thus, the heat dissipation method in the related art has low efficiency, and struggles to remove the heat produced on the anode in a timely fashion, thus affecting the service life of the X-ray generating apparatus.

To solve this problem, embodiments of the present disclosure provide an X-ray generating apparatus and an imaging device; by providing a heat-conducting member for circulating a cooling medium inside an anode target, the heat dissipation efficiency of the X-ray generating apparatus is increased, and the service life of the X-ray generating apparatus is improved. The present disclosure is explained in detail below with reference to particular embodiments.

Figure 2:
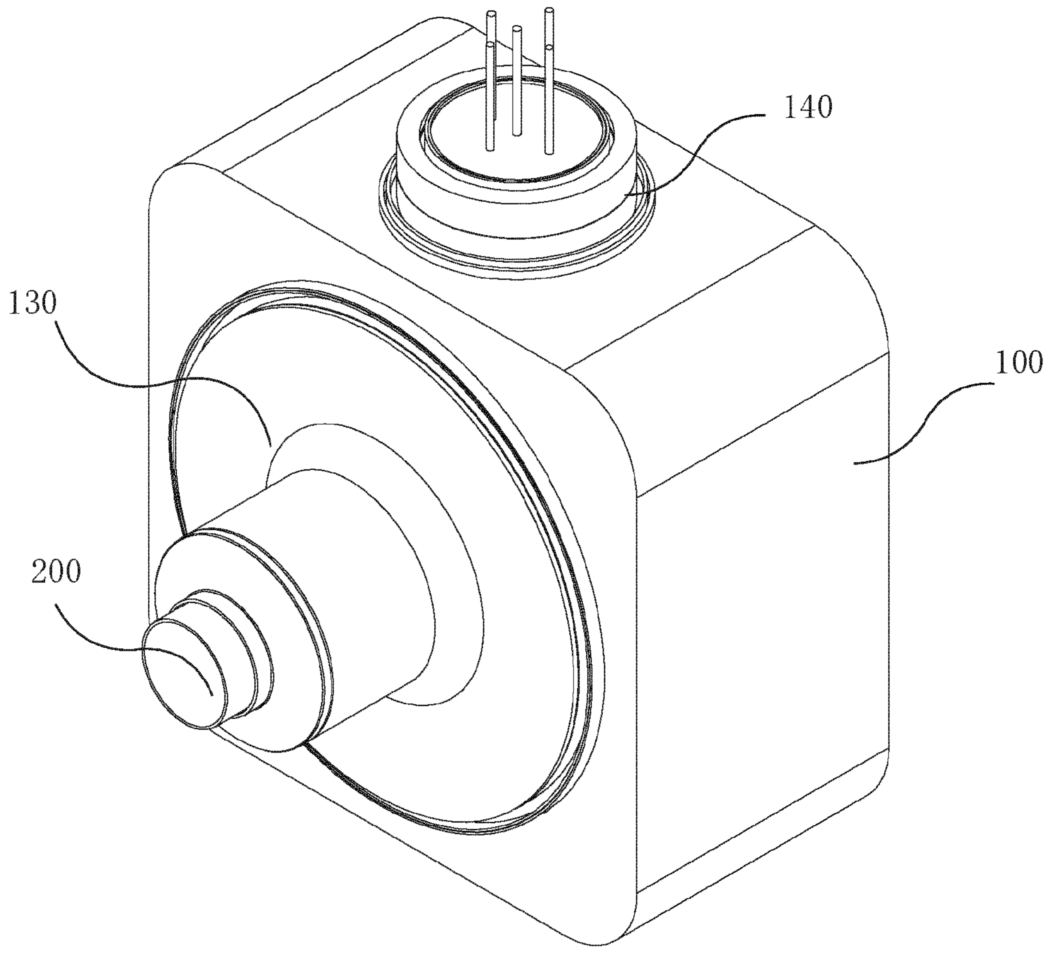
FIG. 2 is a schematic structural drawing of the X-ray generating apparatus, viewed from a side opposite the X-ray emission side, according to an exemplary embodiment of the present disclosure.
Figure 3:
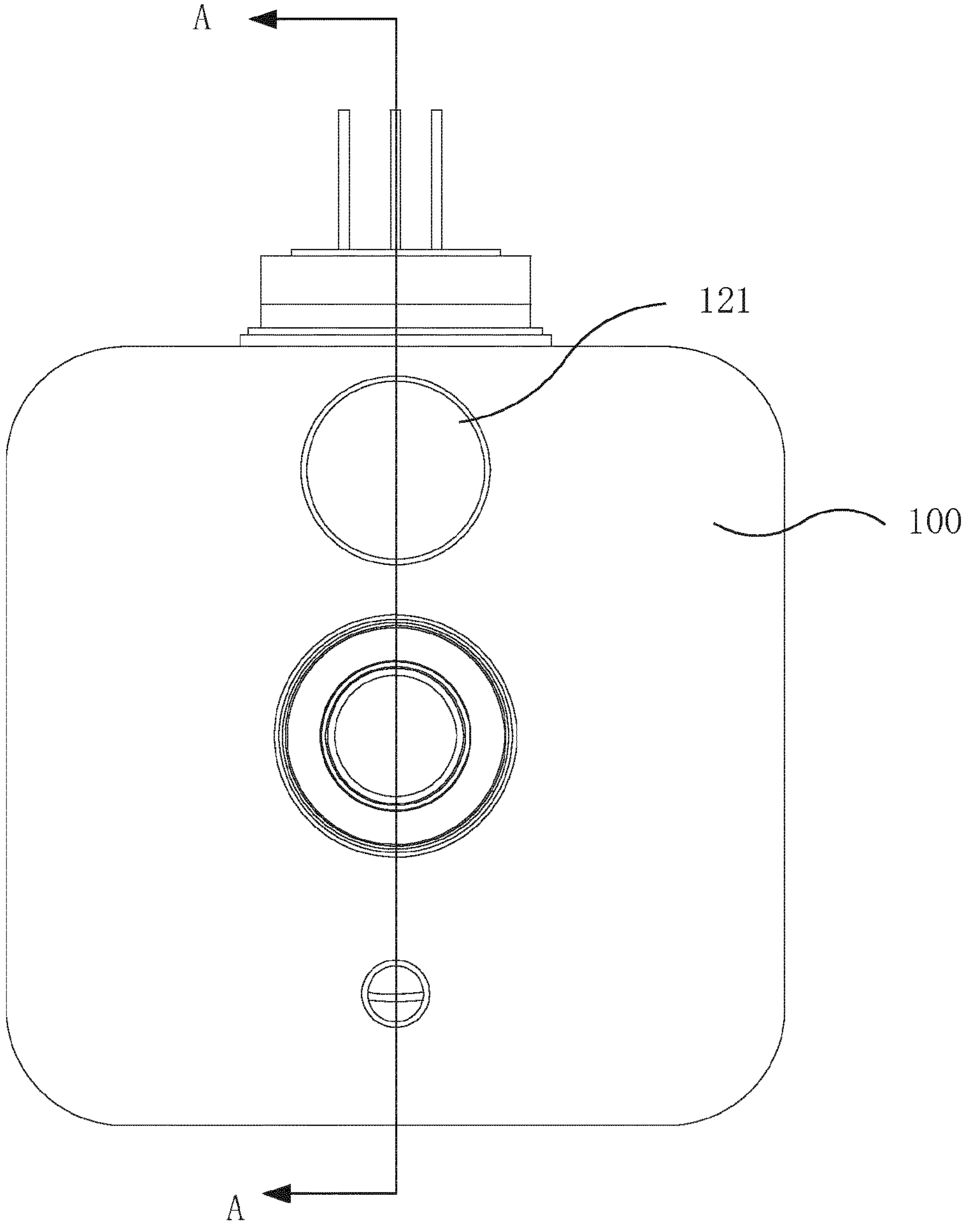
FIG. 3 is a front view of the X-ray generating apparatus according to an exemplary embodiment of the present disclosure.
Figure 4:
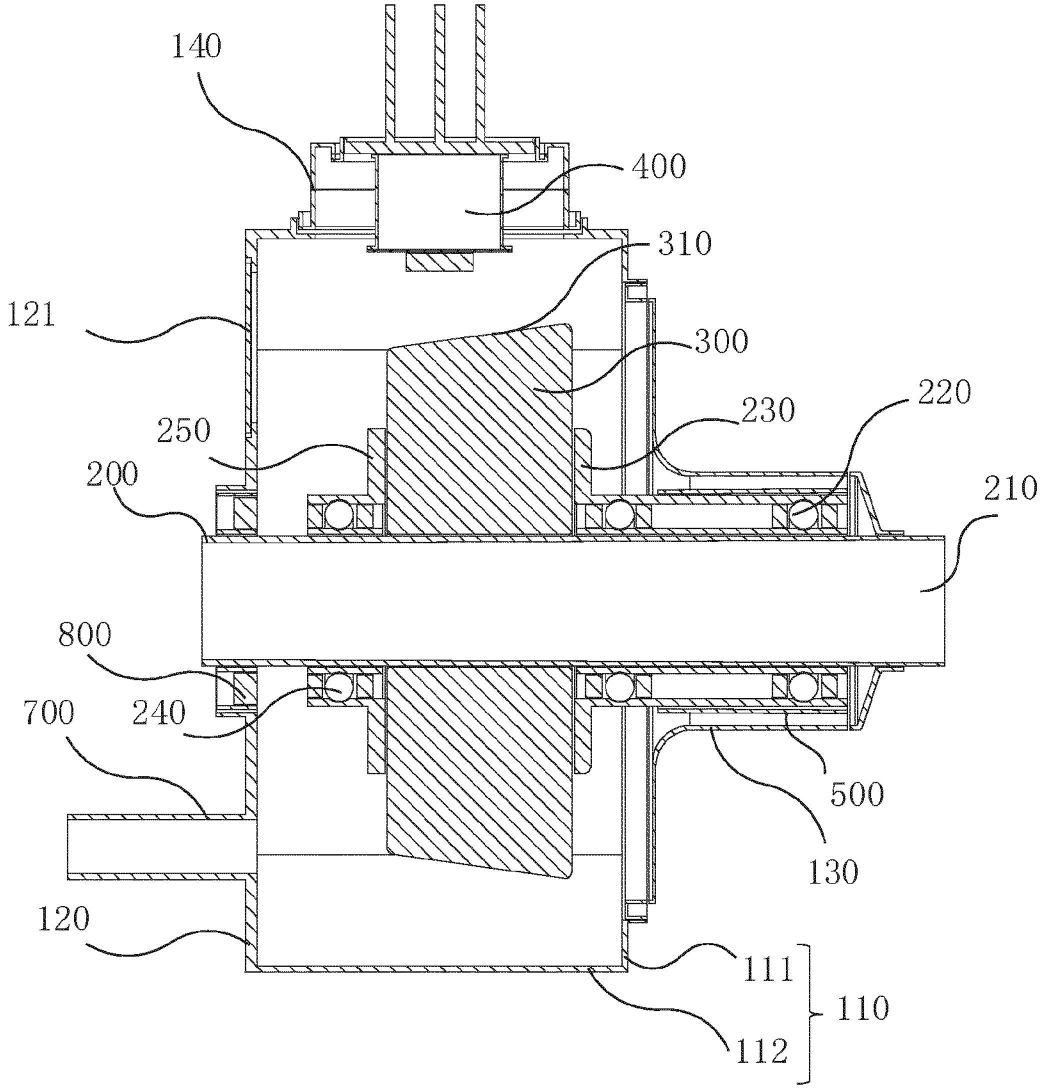
FIG. 4 is a sectional view in the direction A-A in FIG. 3.

FIG. 1 is a schematic structural drawing, viewed from an X-ray emission side, of an X-ray generating apparatus according to an exemplary embodiment of the present disclosure; FIG. 2 is a schematic structural drawing, viewed from a side opposite the X-ray emission side, of the X-ray generating apparatus according to an exemplary embodiment of the present disclosure; FIG. 3 is a front view of the X-ray generating apparatus according to an exemplary embodiment of the present disclosure; and FIG. 4 is a sectional view in the direction A-A in FIG. 3. Referring to FIGS. 1-4, an embodiment of the present disclosure provides an X-ray generating apparatus, which is used to generate X-rays, the X-ray generating apparatus comprising: a casing 100, a heat-conducting member 200, an anode target 300, and a first cathode 400.

The casing 100 serves as the principal component for accommodating the heat-conducting member 200, the first cathode 400, and the anode target 300, and may have various structures; for example, the shape of the casing 100 may be cylindrical or spherical, or the shape of the casing 100 may be a cuboid.

In some embodiments, the casing 100 may comprise a housing 110 and a cover 120. The housing 110 comprises a bottom wall 111 and a sidewall 112 connected to the bottom wall 111, the bottom wall 111 and the sidewall 112 enclosing an accommodating cavity with an opening; the cover 120 covers the opening, and the cover 120 is arranged opposite the bottom wall 111.

The bottom wall 111 may be a plate-like structure; the sidewall 112 is located at one side of the bottom wall 111, and the sidewall 112 may extend along an edge of the bottom wall 111 to form an annular structure. The bottom wall 111 and the sidewall 112 may be connected in various ways. For example, the bottom wall 111 and the sidewall 112 may be connected by welding, riveting, or screwing, or the bottom wall 111 and the sidewall 112 may be integrally formed by a processing method such as casting, extrusion, or stamping. Optionally, the bottom wall 111 and the sidewall 112 may be made of a metal material with good rigidity to support and protect the internal structure.

The bottom wall 111 and the sidewall 112 enclose an accommodating cavity having an opening; the opening may be located at a position opposite the bottom wall 111, the anode target 300 may be located in the accommodating cavity, and the first cathode 400 may be connected to the sidewall 112. At least parts of the structures of the heat-conducting member 200 and the first cathode 400 are also located in the accommodating cavity.

To seal the casing 100, the cover 120 may be provided at the opening, and the bottom wall 111 may be arranged opposite the cover 120. The cover 120 may also be made of a metal material, and the cover 120 may be fixedly connected to the sidewall 112 by a welding method such as brazing. Optionally, an edge of the sidewall 112 close to the opening may be provided with a step structure, and the cover 120 may be engaged in the step structure, thereby achieving positioning of the cover 120 and facilitating the installation and fixing of the cover 120.

A first transmission part 121 is provided on the casing 100; the first transmission part 121 is a window through which X-rays exit the casing 100 and may be formed of metal titanium or a titanium alloy. The first transmission part 121 may have a variety of shapes; for example, it may be round or square. The specific shape may be set according to actual circumstances. As will be understood, the direction in which X-rays are emitted is the direction pointing towards the first transmission part 121 from the anode target 300, i.e., the direction from right to left in FIG. 4.

Optionally, the first transmission part 121 may be arranged on the cover 120; the cover 120 has a mounting hole, and the first transmission part 121 may be mounted in the mounting hole. In some embodiments, when the cover 120 is formed of a metal material, the first transmission part 121 may be fixed by welding to the cover 120 by a welding method such as brazing. In some embodiments, a step structure for positioning the first transmission part 121 may also be provided on the cover 120.

The casing 100 provided in embodiments of the present disclosure is structurally simple and convenient to process, and the X-ray generating apparatus has a rational layout and a compact structure.

The anode target 300 serves as the principal component for generating X-rays and may be used to receive electron bombardment to generate X-rays that exit the casing 100; the anode target 300 may be arranged in the casing 100, and the anode target 300 may rotate at high-speed relative to the casing 100. A common material capable of generating X-rays may be used for the anode target 300, e.g., molybdenum, rhodium, tungsten, or an alloy containing at least one of these.

In some embodiments, the anode target 300 has a first surface 310 for receiving electron bombardment. Taking a plane perpendicular to a rotation axis of the anode target 300 as a cross section, a peripheral dimension of the first surface 310 in the cross section gradually decreases in the direction of X-ray emission, i.e., the peripheral dimension of the first surface 310 in the cross section gradually decreases from an end facing away from the first transmission part 121 towards an end close to the first transmission part 121. In other words, the anode target 300 gradually decreases in size in the direction of X-ray emission. An angle of inclination is formed between the anode target 300 and an electron beam emitted by the first cathode 400, such that the electron (beam) bombards the anode target 300 rotating at high speed to generate X-rays, to guide the X-rays out of the casing 100 through the first transmission part 121. The first surface 310 may be a conical or truncated-cone-shaped outer surface. It can cause the generated X-rays to exit the casing 100 in the direction of the first transmission part 121, thus increasing the X-ray emission quantity.

The first cathode 400 is connected to the casing 100, and the first cathode 400 is arranged to correspond to the anode target 300. Optionally, the first cathode 400 is arranged on the sidewall 112; at least a part of the first cathode 400 extends into the accommodating cavity, and is located at a position corresponding to the anode target 300, such that electrons can bombard the anode target 300 more easily. The first cathode 400 may be used for gathering electrons and may comprise a filament, etc.; when the first cathode 400 is energized, the filament is energized, and a large number of electrons are gathered at the first cathode 400. When a high-voltage electric field is present between the first cathode 400 and the anode target 300, the electrons move toward the anode target 300 and bombard the anode target 300 rotating at high speed to generate X-rays; these X-rays exit the casing 100 through the first transmission part 121.

Figure 5:
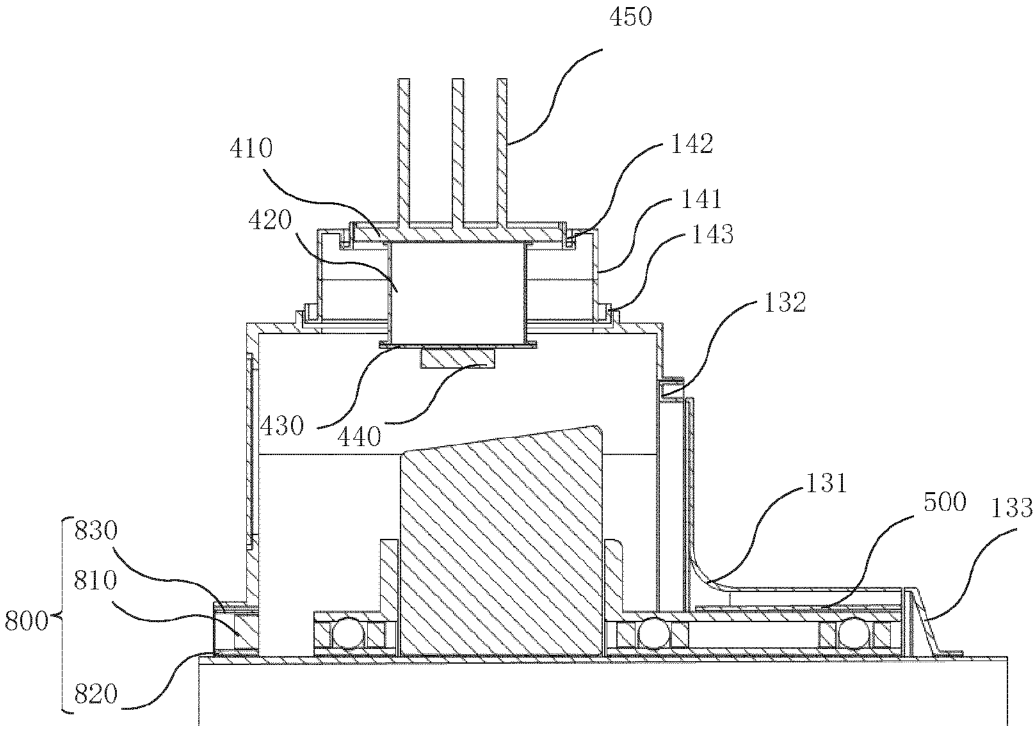
FIG. 5 is a partial enlarged drawing of FIG. 4.

The first cathode 400 may have a variety of particular structures. FIG. 5 is a partial enlarged drawing of FIG. 4; in some embodiments, the first cathode 400 may comprise: a ceramic core 410, a cathode shielding tube 420, a cathode flat plate 430, and a cathode head 440. The cathode shielding tube 420 may pass through the sidewall 112; the cathode flat plate 430 and cathode head 440 are fixed at one end of the cathode shielding tube 420, and the ceramic core 410 is fixed at the other end of the cathode shielding tube 420; the cathode flat plate 430 and cathode head 440 are located in the accommodating cavity, and the ceramic core 410 is located outside the accommodating cavity.

The ceramic core 410 may be made of a ceramic with good electrical insulating properties, and a lead 450 may be connected in a sealed fashion in the middle of the ceramic core 410; the quantity of the lead 450 may be more than one, and the ceramic core 410 may be used to fix and insulate the multiple leads 450. As will be understood, the multiple leads 450 may comprise a cathode lead for energizing the filament and a metal lead for disposing a getter. The ceramic core 410 does not age easily, is resistant to high voltages and high temperatures, and can improve the electromechanical performance of the cathode lead.

The ceramic core 410 may be fixed to the cathode shielding tube 420. These two parts may be connected in various ways: for example, the bottom of the ceramic core 410 may be provided with a first metal ring, which may be connected to the cathode shielding tube 420 in a fixed manner by point welding or another fixing method. The cathode shielding tube 420 may be made of a metal material with good temperature tolerance, and the multiple leads 450 may be arranged to pass through the cathode shielding tube 420. The cathode shielding tube 420 may be used to shield the leads 450, and the getter may be disposed on the metal lead in the cathode shielding tube 420. The getter can absorb gases excited by the X-ray generating apparatus in an operating state, minimizing the gas concentration in the X-ray generating apparatus, thereby increasing the degree of vacuum, avoiding the ignition problem, and increasing the stability of the X-ray generating apparatus.

The cathode flat plate 430 may be a flat-plate structure and may also be made of a metal with good temperature tolerance; the cathode flat plate 430 may be fixed to the bottom of the cathode shielding tube 420 by a fixing method such as brazing or argon arc welding. The cathode flat plate 430 may have a variety of shapes, for example, round or square, etc.; the specific shape may be set according to actual circumstances.

The cathode head 440 may be arranged at an end of the cathode flat plate 430 that faces away from the cathode shielding tube 420. For example, the cathode head 440 may be fixed to the cathode flat plate 430 by a fixing method such as brazing. The cathode head 440 may be made of a metal with good temperature tolerance. The cathode head 440 may be arranged to correspond to the anode target 300, and a filament, for example, may be provided thereon, such that the cathode head 440 may be used for focusing electrons.

As will be understood, to enable the large number of electrons gathered by the first cathode 400 to bombard the anode target 300 at high speed, a vacuum environment may be formed in the casing 100 to reduce collisions between the electrons and gas. In some embodiments, a cathode glass bulb 140 may also be provided outside the casing 100; the cathode glass bulb 140 may be connected to the ceramic core 410, thereby disposing the first cathode 400 in a vacuum environment.

The cathode glass bulb 140 may comprise a cathode glass bulb body 141, a first cathode Kovar ring 142, and a second cathode Kovar ring 143. The cathode glass bulb body 141 may be made of glass or ceramic, and may surround the cathode shielding tube 420. The top of the cathode glass bulb body 141 may be provided with the first cathode Kovar ring 142; the first cathode Kovar ring 142 may be made of Kovar alloy, and can serve as a transitional metal for connecting the cathode glass bulb body 141 to a metal material. A top outer circle of the ceramic core 410 may be provided with a second metal ring; the first cathode Kovar ring 142 may be welded and sealed to the second metal ring, thereby being connected to the ceramic core 410 in a fixed manner.

The second cathode Kovar ring 143 is arranged at the bottom of the cathode glass bulb body 141; the second cathode Kovar ring 143 may also be made of Kovar alloy and can serve as a transitional metal for connecting the cathode glass bulb body 141 to the casing 100. Optionally, the sidewall 112 of the casing 100 may be provided with a connecting hole, and the cathode shielding tube 420 may pass through the connecting hole. A hole wall edge of the connecting hole may form a step structure, and the second cathode Kovar ring 143 may be connected to the step structure in a fixed manner by a fixing method such as argon arc welding.

Continuing to refer to FIGS. 4 and 5, because a large amount of heat will be generated during X-ray generation to prevent the anode target 300 from being penetrated due to bombardment and melting, the X-ray generating apparatus is also provided with the heat-conducting member 200. The heat-conducting member 200 is arranged to run through the casing 100, and the anode target 300 surrounds the heat-conducting member 200 in a rotatable fashion. A through-channel 210 is provided in the interior of the heat-conducting member 200, the through-channel 210 being used for circulating a cooling medium.

Optionally, a central through-hole is formed in the interior of the anode target 300; an inner dimension of the central through-hole may be larger than an outer dimension of the heat-conducting member 200 so that the heat-conducting member 200 can pass through the anode target 300.

The heat-conducting member 200 may be a thin-walled tubular structure, and may extend in the direction of the rotation axis of the anode target 300. The through-channel running through the heat-conducting member 200 is formed in the interior thereof, the extension direction of the through-channel 210 coinciding with the extension direction of the heat-conducting member 200. A cooling medium that can be used for cooling, such as water, oil, or air, may circulate in the through-channel 210. The heat-conducting member 200 may be made of a metal material with good thermal conductivity; when the cooling medium circulates in the through-channel 210, heat produced at the anode target 300 can be promptly carried out of the casing 100.

In some embodiments, the casing 100 may be provided with two through-holes opposite each other; one through-hole is provided in the cover 120, and one through-hole is provided in the bottom wall 111. The heat-conducting member 200 may be located in the casing 100, and two ends thereof may pass through the two through-holes, respectively, such that the heat-conducting member 200 is arranged to run through the cover 120 and the bottom wall 111.

In some embodiments, the heat-conducting member 200 may be fixed to the casing 100. Optionally, an insulating member 800 may be fixed between the heat-conducting member 200 and a hole wall of the through-hole of the cover 120; the insulating member 800 may comprise a first sealing ring 820, an intermediate body 810, and a second sealing ring 830. The first sealing ring 820 may surround and be fixed to the outside of the heat-conducting member 200; for example, the first sealing ring 820 may be a metal sealing ring, which may be welded to the heat-conducting member 200. The second sealing ring 830 surrounds the first sealing ring 820, and the intermediate body 810 is located between the first sealing ring 820 and the second sealing ring 830.

The second sealing ring 830 may also be a metal sealing ring connected to the cover 120 in a fixed manner. For example, a projecting edge that protrudes outward is formed at an edge of the through-hole of the cover 120; an inner surface of the projecting edge can fit an outer surface of the second sealing ring 830, and the two surfaces are fixed together by a method such as argon arc welding.

The intermediate body 810 may be an annular body made of an insulating material such as ceramic; the intermediate body 810 may be welded between the outer surface of the first sealing ring 820 and the inner surface of the second sealing ring 830. The insulating member 800 can not only fix the heat-conducting tube 200 to the casing 100, but can also achieve insulating sealing therebetween.

Another end of the heat-conducting member 200 that faces away from the insulating member 800 may also be connected to the casing 100 in a fixed manner using an anode glass bulb 130. Optionally, the anode glass bulb 130 comprises an anode glass bulb body 131, a first anode Kovar ring 132, and a second anode Kovar ring 133; the anode glass bulb body 131 may be made of glass or ceramic, and may surround the heat-conducting member 200, and the anode glass bulb body 131 may be a flared structure.

A left end of the anode glass bulb body 131 may be provided with the first anode Kovar ring 132; the first anode Kovar ring 132 may be made of Kovar alloy, and may serve as a transitional metal for connecting the anode glass bulb body 131 to the bottom wall 111. Optionally, a hole wall edge of the through-hole of the bottom wall 111 may form a step structure, and the first anode Kovar ring 132 may be connected to the step structure in a fixed manner by a fixing method such as brazing.

The second anode Kovar ring 133 is arranged at a right end of the anode glass bulb body 131; the second anode Kovar ring 133 may also be made of Kovar alloy and may serve as a transitional metal for connecting the anode glass bulb body 131 to the heat-conducting member 200.

The anode glass bulb 131 can not only fix the heat-conducting member 200 to the casing 100. Still, it can also achieve sealing between the heat-conducting member 200 and the casing 100 to form a vacuum-accommodating cavity.

In some embodiments, to ensure that the accommodating cavity can be in a vacuum at all times, a gas discharge tube 700 may also be provided on the casing 100; the gas discharge tube 700 may be connected to a gas extraction apparatus to form a vacuum in the accommodating cavity. Optionally, the gas discharge tube 700 may be arranged on the cover 120.

The rotation of the anode target 300 relative to the heat-conducting member 200 can be achieved using a bearing structure. Continuing to refer to FIG. 4, in some embodiments, a first bearing 220 surrounds the heat-conducting member 200; the first bearing 220 is located at a first end of the anode target 300, and an inner ring of the first bearing 220 is connected to the heat-conducting member 200 in a fixed manner. In contrast, an outer ring of the first bearing 220 is connected to the anode target 300 in a fixed manner. The first bearing 220 can connect the heat-conducting member 200 to the anode target 300, and heat produced by the first bearing 220 can be carried away by the heat-conducting member 200, further improving heat dissipation from the X-ray generating apparatus.

The first bearing 220 may be a common bearing structure, e.g., a deep groove ball bearing, a cylindrical roller bearing, an angular contact ball bearing, a self-aligning ball bearing, etc. The first bearing 220 may be arranged at one end of the anode target 300 in the direction of the rotation axis thereof, which may be the left end or the right end in FIG. 4.

The inner ring of the first bearing 220 may be connected to the heat-conducting member 200 in a fixed manner by a common fixing method such as welding, riveting, or key connection. Optionally, the heat-conducting member 200 may be directly processed into a form that replaces the inner ring of the first bearing 220, i.e., rolling bodies of the first bearing 220 may be arranged directly between the heat-conducting member 200 and the outer ring. The outer ring of the first bearing 220 may be connected to the anode target 300 in a fixed manner; for example, an end face of the outer ring of the first bearing 220 may be connected to a left end face or right end face of the anode target 300 in a fixed manner by a method such as welding. As will be understood, the anode target 300 is connected to the heat-conducting member 200 using the first bearing 220; there is no direct contact between the anode target 300 and the heat-conducting member 200, and a gap may be present therebetween. The size of the gap may be set to a small size, such that the anode target 300 can be infinitely close to the heat-conducting member 200 to improve the heat dissipation effect; at the same time, the presence of the gap can eliminate frictional resistance between the anode target 300 and the heat-conducting member 200 when the anode target is rotating, thus increasing the rotation speed of the anode target 300.

Optionally, a first connecting member 230 is provided between the anode target 300 and the first bearing 220; the first connecting member 230 may be an annular plate-like structure, and the first connecting member 230 surrounds the heat-conducting member 200. One side of the first connecting member 230 is connected in a fixed manner to an end face of the anode target 300, and another side of the first connecting member 230 is connected in a fixed manner to the outer ring of the first bearing 220. The diameter of the first connecting member 230 may be larger than that of the first bearing 220.

In an optional embodiment, the first connecting member 230 may be connected in a fixed manner to the anode target 300 using a screw; the quantity of the screw may be more than one, and the multiple screws may be arranged at intervals in the circumferential direction of the anode target 300. The other side of the first connecting member 230 may be connected in a fixed manner to an end face of the outer ring of the first bearing 220 by a processing method such as welding or integral forming.

The connection of the anode target 300 to the first bearing 220 using the first connecting member 230 can increase the fixing area of the anode target 300, thus improving the fixing result, and at the same time can facilitate removal or replacement of the anode target 300.

As will be understood, in some embodiments, only one first bearing 220 may be provided on the heat-conducting member 200. The first bearing 220 may be arranged at the left end of the anode target 300 or at the right end of the anode target 300. In other optional embodiments, multiple bearings may be provided on the heat-conducting member 200.

For example, continuing to refer to FIG. 4, a second bearing 240 also surrounds the heat-conducting member 200; the second bearing 240 is located at a second end of the anode target 300 that faces away from the first bearing 220, and an inner ring of the second bearing 240 is connected to the heat-conducting member 200 in a fixed manner. In contrast, an outer ring of the second bearing 240 is connected to the anode target 300 in a fixed manner. Thus, two bearings are provided on the heat-conducting member 200 in this embodiment. Specifically, the first bearing 220 and the second bearing 240; the first bearing 220 and the second bearing 240 are connected to two ends of the anode target 300, respectively.

Taking as an example the case where the first bearing 220 is located at the right end of the anode target 300 and the second bearing 240 is located at the left end of the anode target 300, a left end face of the outer ring of the first bearing 220 may be connected in a fixed manner to the right end face of the anode target 300, and a right end face of the outer ring of the second bearing 240 may be connected in a fixed manner to the left end face of the anode target 300. For the specific manner of connection between the second bearing 240 and the heat-conducting member 200 or the anode target 300, the manner of connection between the first bearing 220 and the heat-conducting member 200 or the anode target 300 may be referred to; the description will not be repeated here. The first bearing 220 and the second bearing 240 can simultaneously serve the function of supporting the anode target 300; the forces borne by the anode target 300 are balanced, the noise produced by rotation of the anode target 300 can be reduced, and the stability of rotation of the anode target 300 can be increased.

In some embodiments, a second connecting member 250 is provided between the anode target 300 and the second bearing 240; the second connecting member 250 surrounds the heat-conducting member 200. One side of the second connecting member 250 is connected in a fixed manner to an end face of the anode target 300, and another side of the second connecting member 250 is connected in a fixed manner to the outer ring of the second bearing 240. The diameter of the second connecting member 250 may be larger than the diameter of the second bearing 240.

Optionally, the second connecting member 250 may be connected in a fixed manner to the anode target 300 using a screw; the quantity of the screw may be more than one, and the multiple screws may be arranged at intervals in the circumferential direction of the anode target 300. The other side of the second connecting member 250 may be connected in a fixed manner to an end face of the outer ring of the second bearing 240 by a processing method such as welding or integral forming.

The connection of the anode target 300 to the second bearing 240 using the second connecting member 250 can increase the fixing area of the anode target 300, thus improving the fixing result, and at the same time can facilitate removal or replacement of the anode target 300.

It will be understood that the second bearing 240 may be a common bearing structure, e.g., a deep groove ball bearing, a cylindrical roller bearing, an angular contact ball bearing, a self-aligning ball bearing, etc. The first bearing 220 may be the same type as the second bearing 240 or a different type. Optionally, the first bearing 220 is a double row bearing, and the second bearing 240 is a single row bearing; the first bearing 220, the anode target 300 and the second bearing 240 are arranged in sequence in the direction of X-ray emission, i.e., the first bearing 220 is located at the end of the anode target 300 that faces away from the first transmission part 121. The single row bearing is a bearing structure having only one set of rollers; the double row bearing is a bearing structure having two sets of rollers, wherein the two sets of rollers may be arranged spaced apart in the axial direction of the first bearing 220. The single row bearing can lower the production cost, while the double row bearing can facilitate the installation of a rotor 500, to drive the anode target 300 to rotate.

In some embodiments, to achieve high-speed rotation of the anode target 300, the X-ray generating apparatus also comprises the rotor 500. The rotor 500 surrounds the first bearing 220, and the rotor 500 is connected in a fixed manner to the outer ring of the first bearing 220. The rotor 500 may be a common rotor structure, e.g., may be a magnetically permeable metal ring; the rotor 500 may, in cooperation with a stator, form a drive electric motor structure with an outer stator and an inner rotor. The stator may be a structure such as a stator coil and may be arranged outside the casing 100. Optionally, the stator may surround the anode glass bulb 130. The rotor 500 may be fixed to the outer ring of the first bearing 220; when the stator is energized, it can drive the rotor 500 to rotate at high speed, to drive the outer ring of the first bearing 220 to rotate relative to the inner ring of the first bearing 220, thereby driving the anode target 300 to rotate relative to the heat-conducting member 200.

In some embodiments, the drive structure of the anode target 300 can be simplified by arranging the rotor 500 on the outer ring of the first bearing 220 in the X-ray generating apparatus, such that the anode target 300 can rotate at high speed relative to the heat-conducting member 200.

Figure 6:
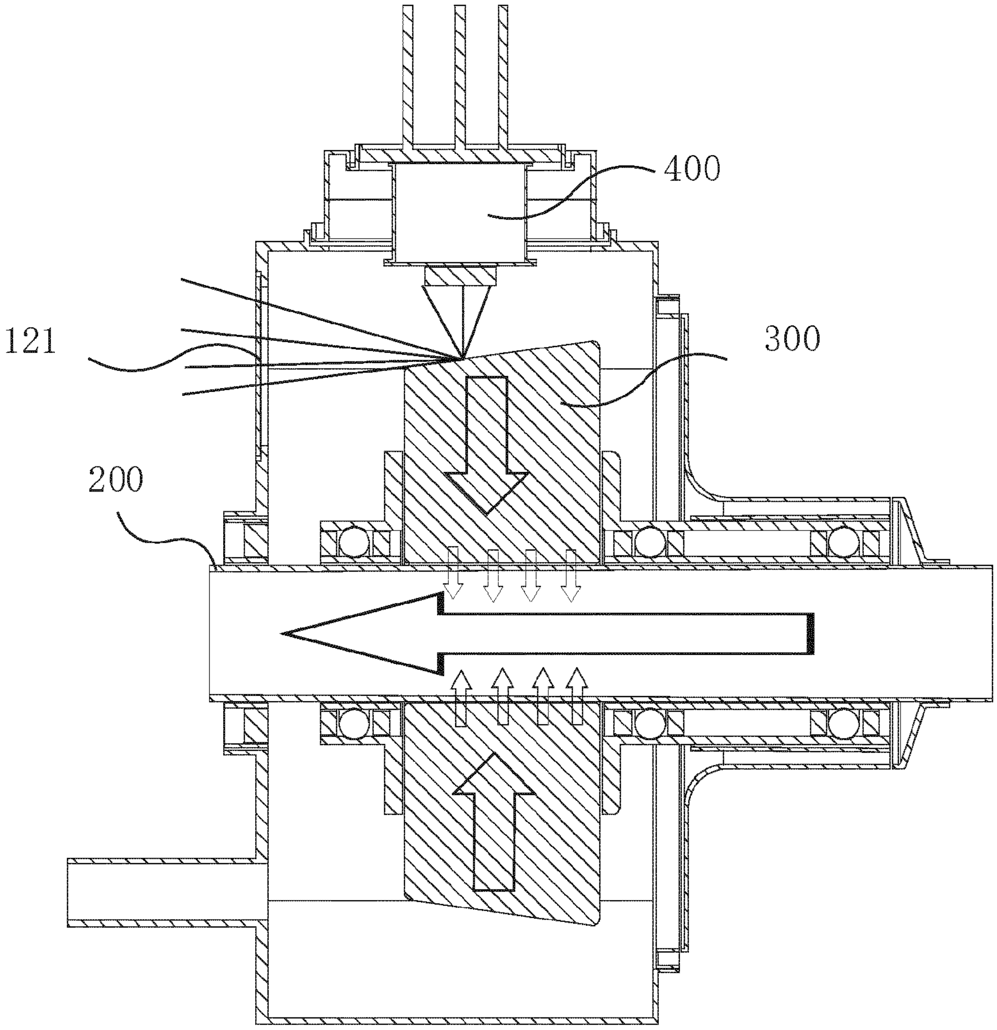
FIG. 6 is a schematic diagram of heat dissipation in the X-ray generating apparatus in FIG. 4.

FIG. 6 is a schematic diagram of heat dissipation in the X-ray generating apparatus in FIG. 4. Referring to FIG. 6 when the X-ray generating apparatus is operating, the rotor 500 drives the anode target 300 to rotate at high speed; the first cathode 400 is energized, and a large number of electrons are gathered thereon; the electrons bombard the anode target 300 under the action of a high-voltage electric field, and generate X-rays; and the X-rays exit the casing 100 through the first transmission part 121. At the same time, because there is a large amount of energy converted to thermal energy in the process of X-ray generation, a large amount of heat is gathered on the anode target 300. Coolant circulating in the heat-conducting member 200 can carry away the heat on the anode target 300, promptly lowering the temperature of the anode target 300, preventing the anode target 300 from being penetrated due to bombardment and melting, and, at the same time avoiding phenomena such as pyrolysis of insulating oil and ignition in the tube caused by the temperature of the anode target 300 being too high, thus increasing the operating stability and service life of the X-ray generating apparatus. In addition, because the through-channel 210 of the heat-conducting member 200 is a straight-through structure, the cooling pathway structure is simple, and the flow speed of the cooling medium can be increased, resulting in a good cooling effect.

It will be understood that in the related art, the dissipation of anode heat mainly relies on outward radiation of heat from the anode target, and heat conduction through contact between the balls of the bearing and the inner/outer rings of the bearing. In some embodiments according to the present disclosure, the heat of the anode target 300 can be dissipated using the heat-conducting member 200 running through the anode target 300; because the gap between the heat-conducting member 200 and the anode target 300 is very small, heat can radiate to the heat-conducting member 200 quickly, and be carried away by the cooling medium in the heat-conducting member 200. It is thus possible to dissipate heat from the anode target 300 continuously, thereby improving the result in terms of heat dissipation from the anode target 300. In addition, the first bearing 220 and second bearing 240 can also achieve contact heat conduction, conducting the heat of the anode target 300 to the heat-conducting member 200; at the same time, the cooling medium circulating in the heat-conducting member 200 can promptly carry away the heat on the first bearing 220 and second bearing 240, further improving the heat dissipation effect and increasing the service life of the first bearing 220 and second bearing 240.

It must be explained that in FIG. 6, the direction of circulation of the cooling medium is from right to left, but in other optional embodiments, the cooling medium may also flow from left to right. In addition, in the above description, nouns indicating orientation, such as top, bottom, left, and right, are based on the drawings' orientations and are not used to limit the present application. Top/bottom and left/right orientations can vary adaptively in other views or orientations.

Figure 7:
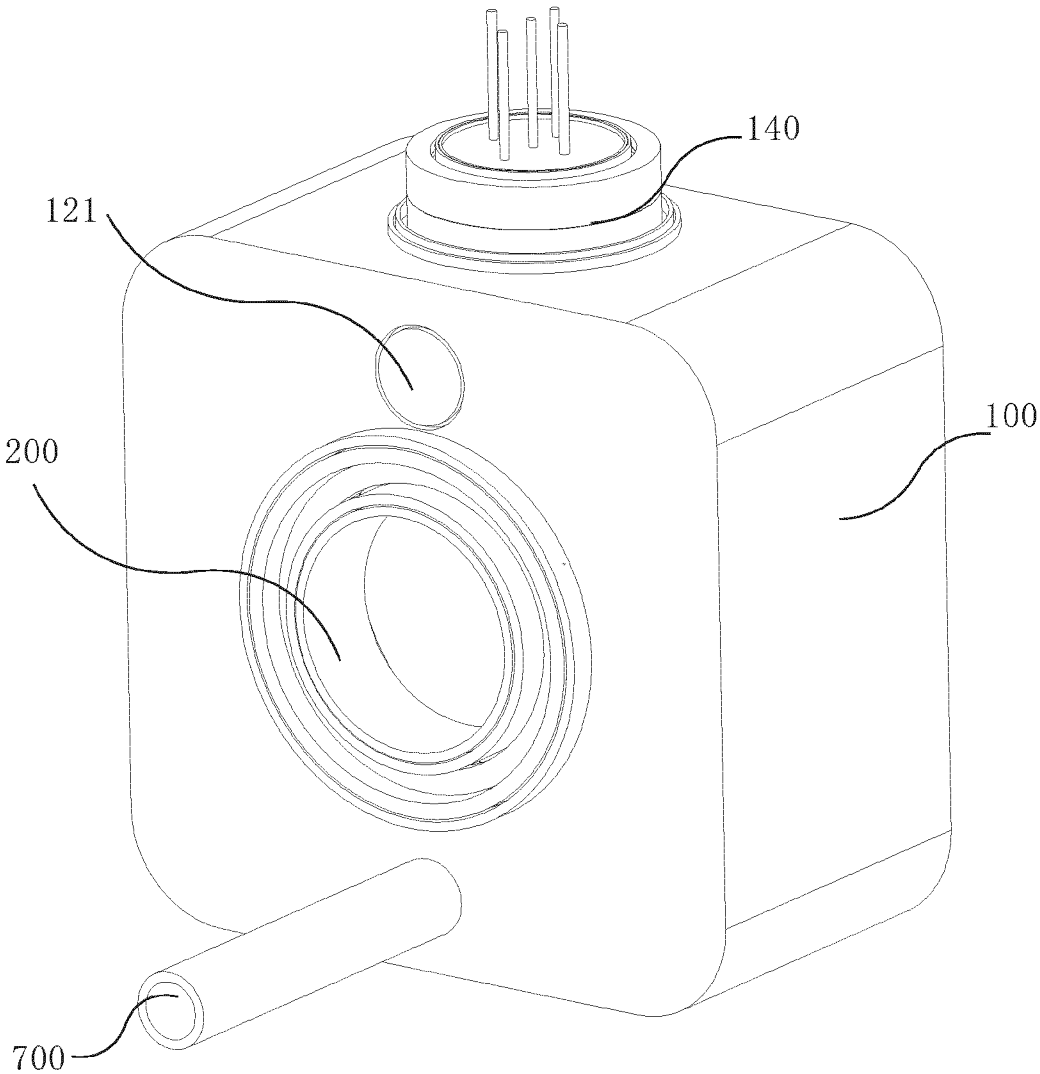
FIG. 7 is a schematic structural drawing of an X-ray generating apparatus, viewed from an X-ray emission side, according to another exemplary embodiment of the present disclosure.
Figure 8:
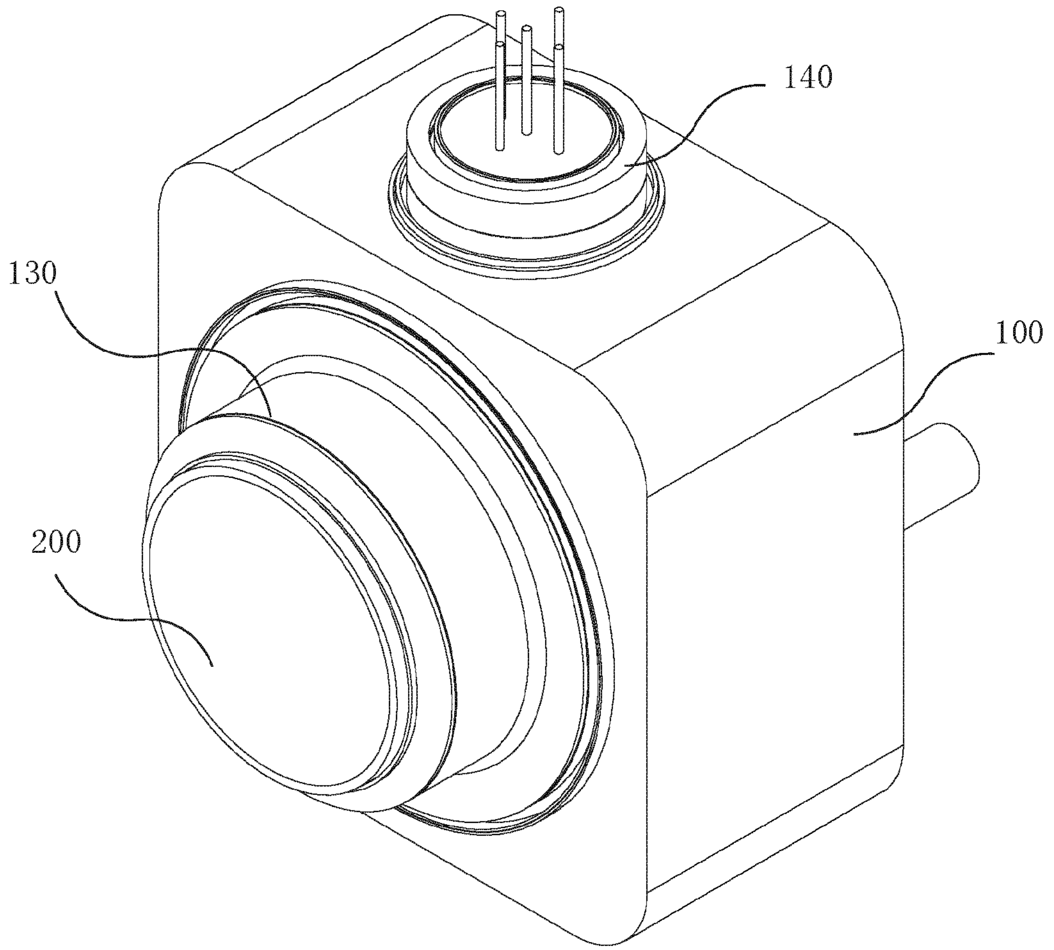
FIG. 8 is a schematic structural drawing of the X-ray generating apparatus, viewed from a side opposite the X-ray emission side, according to another exemplary embodiment of the present disclosure.
Figure 9:
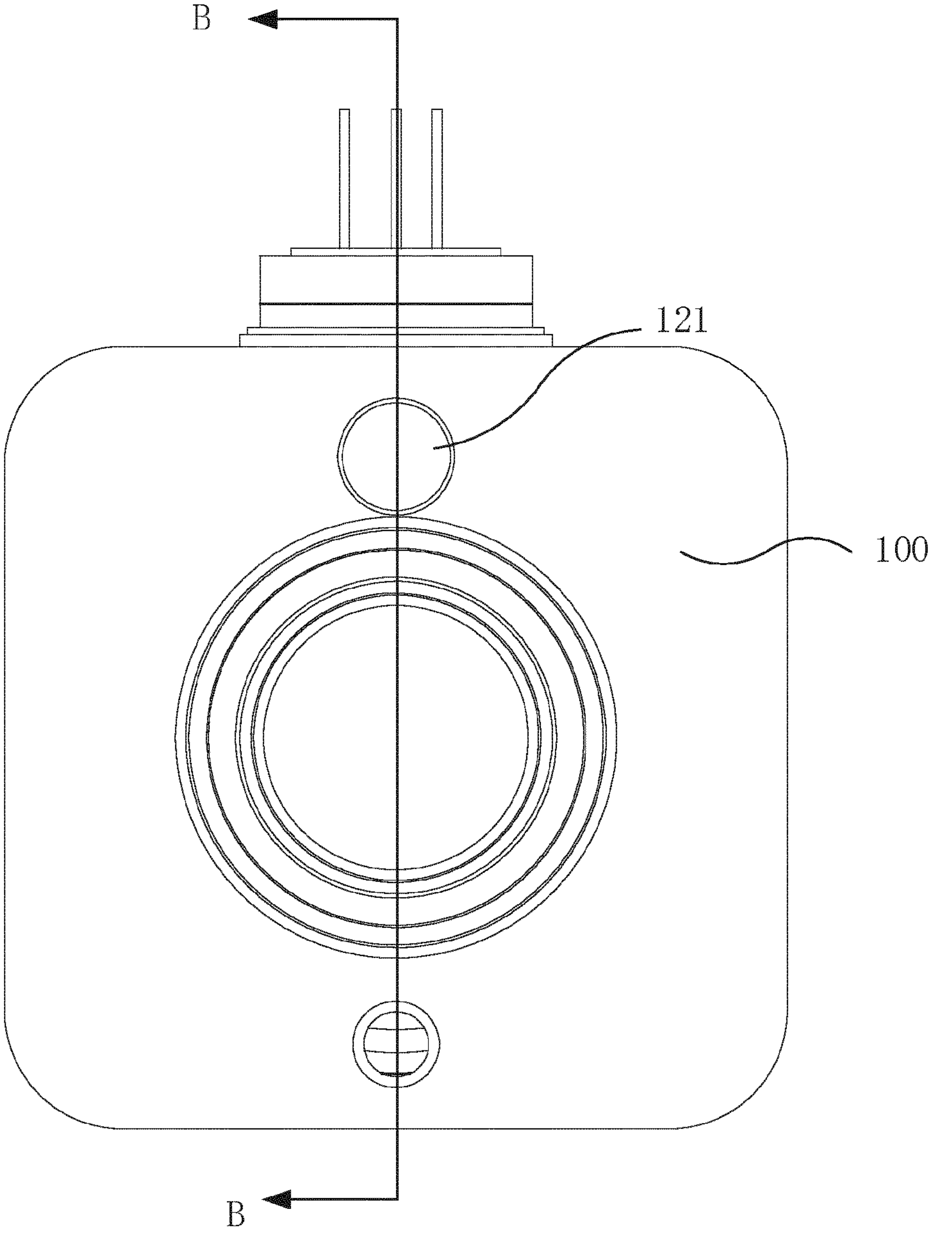
FIG. 9 is a front view of the X-ray generating apparatus according to another exemplary embodiment of the present disclosure.
Figure 10:
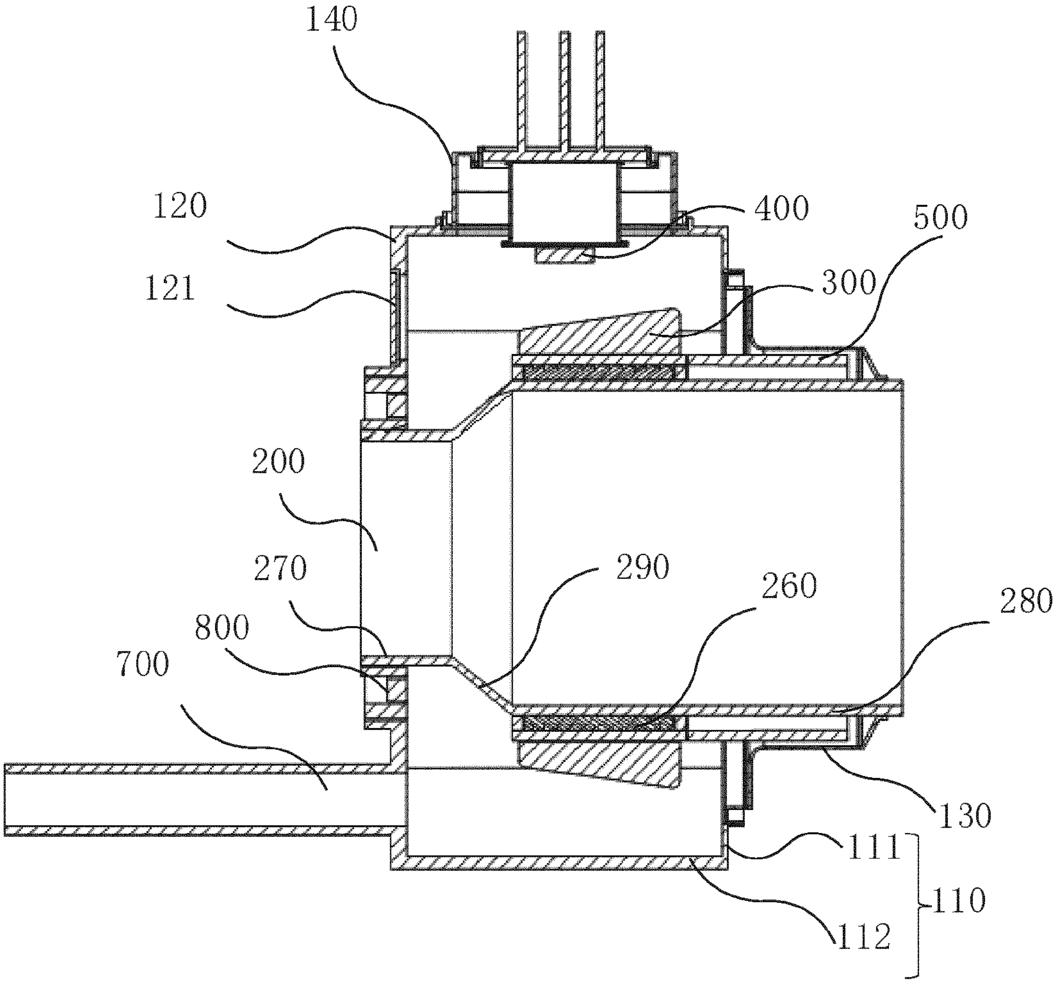
FIG. 10 is a sectional view in the direction B-B in FIG. 9.

FIG. 7 is a schematic structural drawing of an X-ray generating apparatus, viewed from an X-ray emission side, according to another exemplary embodiment of the present disclosure; FIG. 8 is a schematic structural drawing of the X-ray generating apparatus, viewed from a side opposite the X-ray emission side, according to another exemplary embodiment of the present disclosure; FIG. 9 is a front view of the X-ray generating apparatus according to another exemplary embodiment of the present disclosure; and FIG. 10 is a sectional view in the direction B-B in FIG. 9. Referring to FIGS. 7-10, based on the embodiment described with reference to FIGS. 1-5, the manner of connection between the anode target 300 and the heat-conducting member 200 is improved. Other structures not described in detail are the same as or similar to those in the embodiment described with reference to FIGS. 1-5; for specific details, the embodiment described above with reference to FIGS. 1-5 may be referred to, and the description will not be repeated here.

Referring to FIG. 10, in some embodiments, a third bearing 260 is provided between the anode target 300 and the heat-conducting member 200; an outer ring of the third bearing 260 is connected in a fixed manner to an inner surface of the anode target 300, and an inner ring of the third bearing 260 is connected in a fixed manner to an outer surface of the heat-conducting member 200.

The third bearing 260 may be a common bearing structure, e.g., a deep groove ball bearing, a cylindrical roller bearing, an angular contact ball bearing, a self-aligning ball bearing, etc. The third bearing 260 may be arranged between opposite surfaces of the anode target 300 and the heat-conducting member 200. The inner ring of the third bearing 260 may be connected to the heat-conducting member 200 in a fixed manner by a common fixing method such as welding, riveting, or key connection. The outer ring of the third bearing 260 may also be connected to the inner surface of the anode target 300 in a fixed manner by a common fixing method such as welding, riveting, or key connection.

Optionally, the heat-conducting member 200 may be directly processed into a form that replaces the inner ring of the third bearing 260, i.e., rolling bodies of the third bearing 260 may be arranged directly between the heat-conducting member 200 and the outer ring. The third bearing 260 may achieve direct contact conduction between the anode target 300 and the heat-conducting member 200.

In some embodiments, the third bearing 260 comprises a liquid metal bearing. The liquid metal bearing comprises an outer ring, an inner ring, and liquid metal; the liquid metal is sealed between the inner ring and the outer ring, and when the outer ring rotates relative to the inner ring, the liquid metal serves a lubricating function. The liquid metal bearing eliminates the rolling bodies in a conventional bearing, further reducing friction between the inner/outer rings and the rotor, so frictional resistance is small.

In addition, because the interior of the liquid metal bearing is filled with liquid metal, the heat of the anode target 300 can be conducted to the heat-conducting member 200 via the outer ring, liquid metal, and inner ring of the liquid metal bearing by heat conduction directly. Contact conduction has a good heat dissipation effect, thus improving the heat dissipation effect and service life of the anode target 300 and the third bearing 260, thereby enabling the X-ray generating apparatus to achieve higher instantaneous power and continuous input power.

In some embodiments, to drive the anode target 300 to rotate, a rotor 500 surrounds the heat-conducting member 200. The rotor 500 and the third bearing 260 are arranged in sequence in the direction of X-ray emission, i.e., the rotor 500 is located at an end of the third bearing 260 that faces away from the first transmission part 121. An end face of the rotor 500 is connected in a fixed manner to an end face of the outer ring of the third bearing 260. A gap is present between the rotor 500 and the heat-conducting member 200. Thus, the rotor 500 may be suspended outside the heat-conducting member 200 using the outer ring of the third bearing 260. The fixed connection between the rotor 500 and the outer ring of the third bearing 260 may take various forms; for example, the two parts may be fixed by a common method, such as welding, snap-fitting, or riveting.

The rotor 500 may be a common rotor structure, e.g., may be a magnetically permeable metal ring; the rotor 500 may, in cooperation with a stator, form a drive electric motor structure with an outer stator and an inner rotor. The stator may be a structure such as a stator coil and may be arranged outside the casing 100. Optionally, the stator may surround the anode glass bulb 130. The rotor 500 may be fixed to the outer ring of the third bearing 260; when the stator is energized, it can drive the rotor 500 to rotate at high speed, to drive the outer ring of the third bearing 260 to rotate relative to the inner ring of the third bearing 260, thereby driving the anode target 300 to rotate relative to the heat-conducting member 200.

By fixing the rotor 500 to the end face of the outer ring of the third bearing 260, the drive structure of the anode target 200 can be simplified such that the anode target 300 can rotate at high speed relative to the heat-conducting member 200.

Continuing to refer to FIG. 10, in some embodiments, the heat-conducting member 200 comprises a first segment 270, a second segment 280, and a transitional segment 290. The second segment 280, transitional segment 290, and first segment 270 are connected in sequence in the direction of X-ray emission, wherein the direction of X-ray emission is the direction from right to left in FIG. 10, i.e., the heat-conducting member 200 is sequentially the first segment 270, the transitional segment 290 and the second segment 280 from left to right.

Taking a plane perpendicular to the axis of the heat-conducting member 200 as a cross section, a cross-sectional peripheral dimension of the first segment 270 is smaller than a cross-sectional peripheral dimension of the second segment 280, and a cross-sectional peripheral dimension of the transitional segment 290 gradually increases from an end close to the first segment 270 to an end close to the second segment 280. The first segment 270 and second segment 290 may be cylindrical segments, while the transitional segment 290 may be a truncated-cone segment; the transitional segment 290 can improve the angle of connection between the first segment 270 and the second segment 290, reducing the resistance to cooling medium circulation, and avoiding stress concentration in the heat-conducting member 200.

The anode target 300 surrounds the second segment 280, and the third bearing 260 may be arranged between the anode target 300 and the second segment 280. The first segment 270 may be connected to the cover 120 via the insulating member 800, and the second segment 280 may be connected to the anode glass bulb 130. In this embodiment, because the peripheral dimension of the first segment 270 in the cross section is smaller than the peripheral dimension of the second segment 280 in the cross section, it is possible to suitably reduce the area of the through-hole in the cover 120 through which the heat-conducting member 200 passes, and increase the area of the first transmission part 121, thereby increasing the X-ray emission quantity. At the same time, the outer surface of the heat-conducting member 200 can be brought closer to an outer surface of the anode target 300, such that heat can be transferred rapidly to the heat-conducting member 200 from the anode target 300, thus improving the heat dissipation effect.

Figure 11:
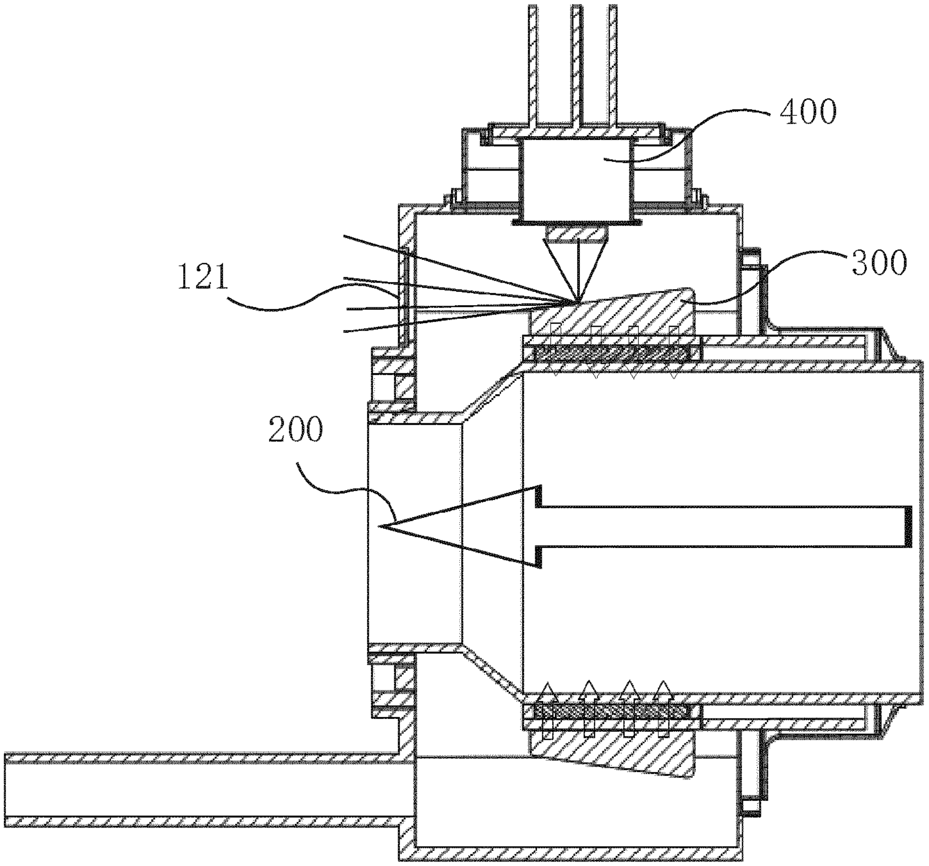
FIG. 11 is a schematic diagram of heat dissipation in the X-ray generating apparatus in FIG. 10.

FIG. 11 is a schematic diagram of heat dissipation in the X-ray generating apparatus in FIG. 10. Referring to FIG. 11, when the X-ray generating apparatus is operating, the rotor 500 drives the anode target 300 to rotate at high speed; the first cathode 400 is energized, and a large number of electrons are gathered thereon; the electrons bombard the anode target 300 under the action of a high-voltage electric field, and generate X-rays; and the X-rays exit the casing 100 through the first transmission part 121. At the same time, because there is a large amount of energy converted to thermal energy in the process of X-ray generation, a large amount of heat is gathered on the anode target 300. This heat can be conducted to the heat-conducting member 200 directly via the third bearing 260, and carried out of the casing 100 by the cooling medium in the heat-conducting member 200. Compared with heat transfer by thermal radiation in the related art, contact heat dissipation has higher heat dissipation efficiency, thus increasing the X-ray generating apparatus's operating stability and service life. In addition, because the anode target 300 is fixed to the outer ring of the third bearing 260, the forces borne by the third bearing 260 are more balanced. Thus, the operating noise of the anode target 300 is reduced, and the operating stability is increased.

It must be explained that in FIG. 11, the direction of circulation of the cooling medium is from right to left, but in other optional embodiments, the cooling medium may also flow from left to right. In addition, in the above description, nouns indicating orientation, such as top, bottom, left, and right, are based on the orientations in the drawings and are not used to limit the present application. Top/bottom and left/right orientations can vary adaptively in other views or orientations.

Figure 12:
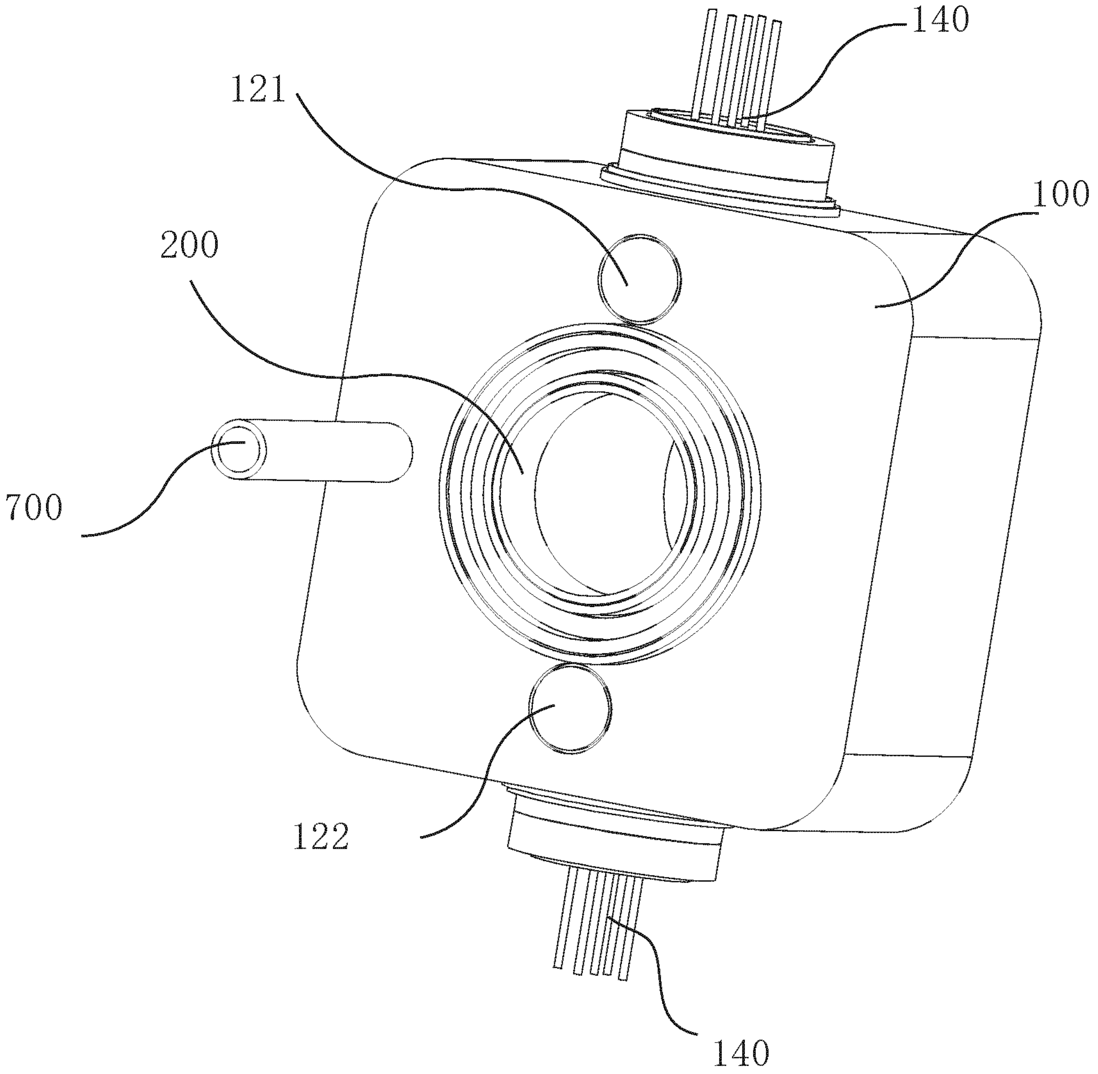
FIG. 12 is a schematic structural drawing, viewed from an X-ray emission side, of an X-ray generating apparatus according to another exemplary embodiment of the present disclosure.
Figure 13:
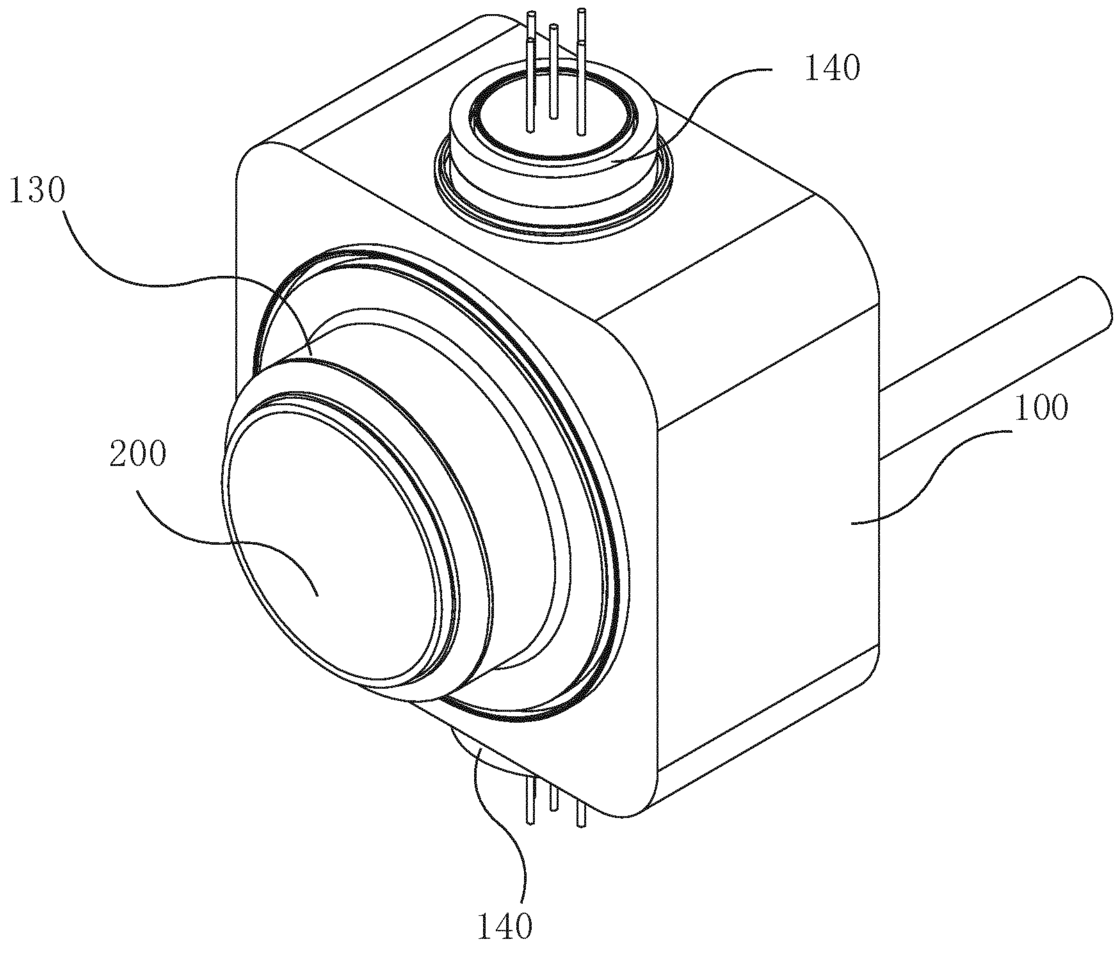
FIG. 13 is a schematic structural drawing of the X-ray generating apparatus, viewed from a side opposite the X-ray emission side, according to another exemplary embodiment of the present disclosure.
Figure 14:
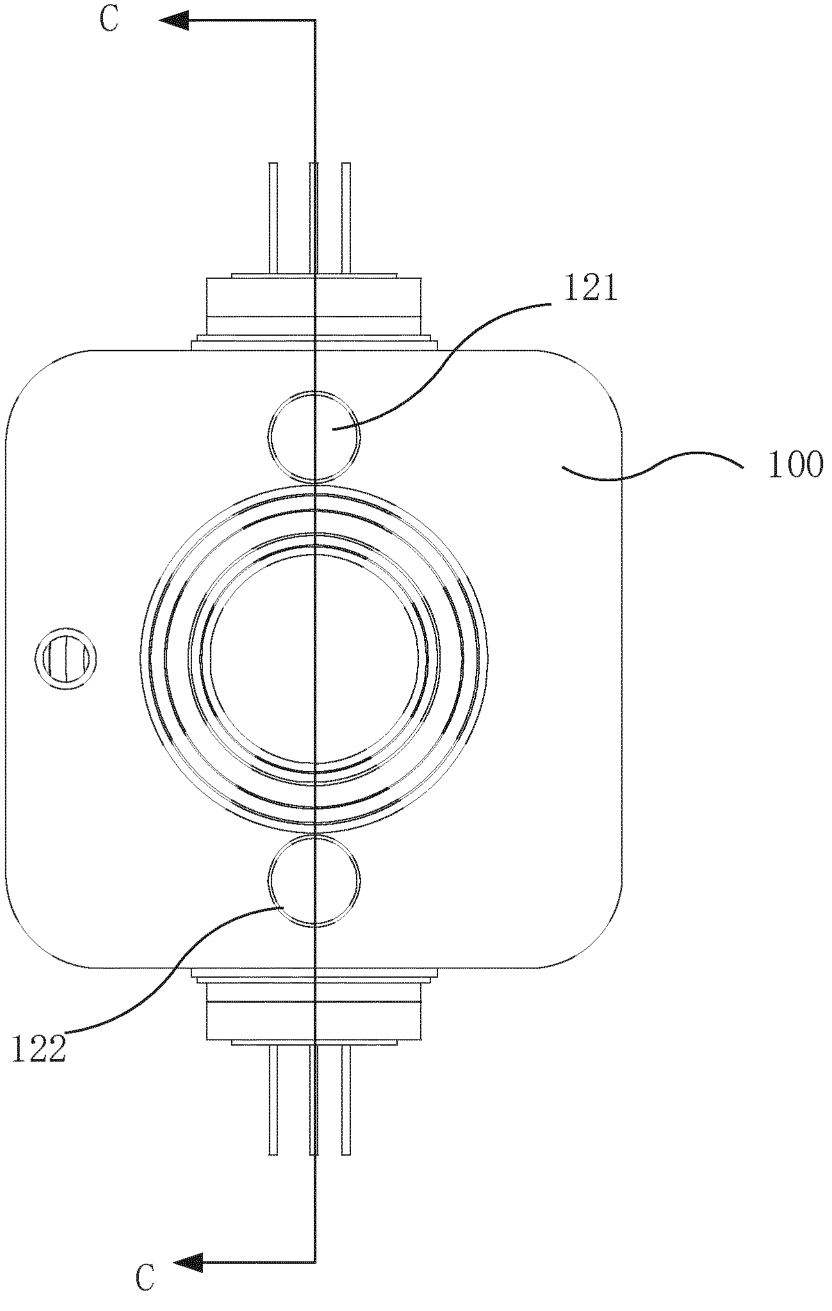
FIG. 14 is a front view of the X-ray generating apparatus according to another exemplary embodiment of the present disclosure.
Figure 15:
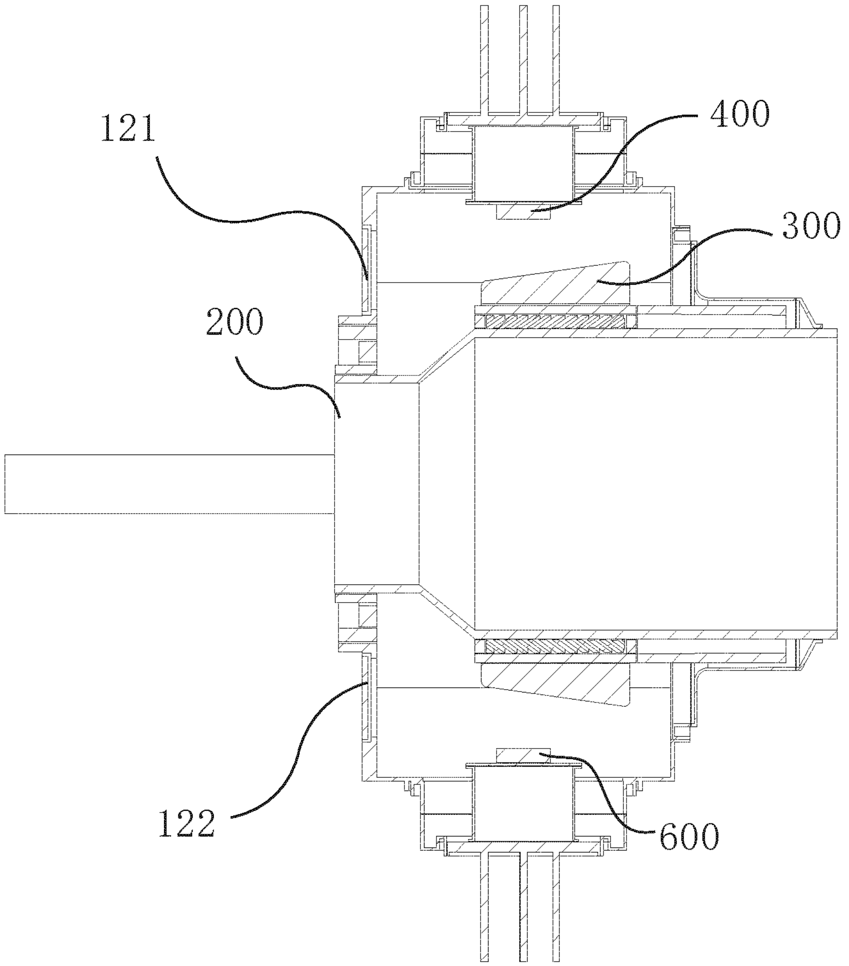
FIG. 15 is a sectional view in the direction C-C in FIG. 14.

FIG. 12 is a schematic structural drawing, viewed from an X-ray emission side, of an X-ray generating apparatus according to another exemplary embodiment of the present disclosure; FIG. 13 is a schematic structural drawing, viewed from a side opposite the X-ray emission side, of the X-ray generating apparatus according to another exemplary embodiment of the present disclosure; FIG. 14 is a front view of the X-ray generating apparatus according to another exemplary embodiment of the present disclosure; and FIG. 15 is a sectional view in the direction C-C in FIG. 14. Referring to FIGS. 12-15, the X-ray generating apparatus has a first cathode 400 and a second cathode 600, i.e., a dual-cathode structure.

In the embodiment shown in FIGS. 12-15, the X-ray generating apparatus further comprises: the second cathode 600 connected to the casing 100; the casing 100 also has a second transmission part 122; the second cathode 600 is arranged to correspond to the anode target 300 so that electrons produced by the second cathode 600 bombard the anode target 300 to generate X-rays, and these X-rays exit the casing 100 through the second transmission part 122.

The second cathode 600 has the same structure as the first cathode 400 and may also comprise: a ceramic core, a cathode shielding tube, a cathode flat plate, and a cathode head, and the second cathode 600 may also be fixed to the casing 100 using a cathode glass bulb; for specific details, the structure and form of connection of the first cathode 400 may be referred to, and the description will not be repeated here.

The second cathode 600 may also be used to generate X-rays; X-rays generated through the bombardment of the anode target 300 by electrons gathered in the second cathode 600 can exit the casing 100 through the second transmission part 122. The second transmission part 122 may be arranged on the cover 120, and the structure and form of connection thereof may be the same as those of the first transmission part 121; for specific details, the first transmission part 121 may be referred to.

In some embodiments, the second cathode 600 and the first cathode 400 are arranged symmetrically with respect to the rotation axis of the anode target 300, and the first transmission part 121 and second transmission part 122 may also be arranged symmetrically with respect to the rotation axis; it is thereby possible to simultaneously generate two parallel beams of X-rays for imaging, thus reducing the quantity of unusable X-rays.

Figure 16:
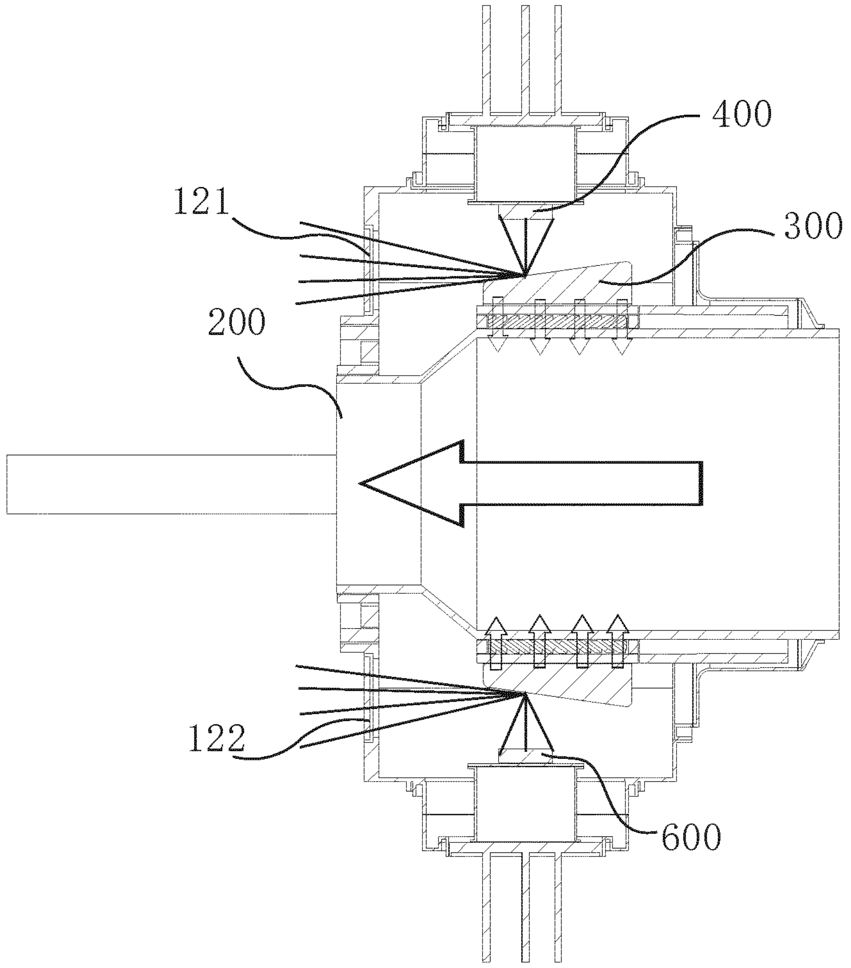
FIG. 16 is a schematic diagram of heat dissipation in the X-ray generating apparatus in FIG. 15.

FIG. 16 is a schematic diagram of heat dissipation in the X-ray generating apparatus in FIG. 15. Referring to FIG. 16, when the X-ray generating apparatus is operating, the rotor 500 drives the anode target 300 to rotate at high speed; the first cathode 400 and second cathode 600 are energized, such that a large number of electrons are gathered on the first cathode 400 and second cathode 600; under the action of a high-voltage electric field, the electrons simultaneously bombard the anode target 300, and generate two beams of X-rays; the beam of X-rays generated by the first cathode 400 exits the casing 100 through the first transmission part 121, and the beam of X-rays generated by the second cathode 600 exits the casing 100 through the second transmission part 122; the X-ray emission quantity is thereby increased, thus increasing the speed of scanning and imaging. At the same time, it is possible to reduce the time for which the person being scanned is exposed to X-rays.

It will be understood that when the X-ray generating apparatus is used to scan an object moving at high speed, the imaging result will be poor. To improve the imaging result, the method generally employed in the related art is to increase the rotation speed of X-rays to enhance the ability thereof to capture the moving object. However, limited by industrial standards and the huge centrifugal force caused by rotation, the fastest X-rays can only achieve 0.27 s/r. Thus, when the X-ray rotation speed is limited, to obtain a clear image, the only option in the related art is to increase the rotation angle to increase the data acquisition amount; as a result, the time for which the person being scanned is exposed to X-rays will be increased, so there will be a radiation risk. In some embodiments of the present disclosure, as a result of providing the dual-cathode structure, the first cathode 400 and second cathode 600 can generate X-rays simultaneously, thus increasing the X-ray scanning speed, reducing the time for which the person being scanned is exposed to X-rays, reducing the radiation dose absorbed by the person being scanned, and improving the image quality.

At the same time, it is also possible to generate X-rays of different energies by applying different voltages to the first cathode 400 and the second cathode 600 to acquire image information for different tissues; an X-ray image capable of showing histochemical components, i.e., an image of tissue characteristics, can then be obtained by image fusion and reconstruction techniques, thus providing abundant image information for the imaging result.

Because the electrons produced by the first cathode 400 and the second cathode 600 bombard the anode target 300 simultaneously, the heat in the anode target 300 will increase to twice the original level, so compared with the structure in the related art, the anode target 300 is more likely to be penetrated due to bombardment and melt. As a result of configuring the heat-conducting member 200 as a structure running through the anode target 300, the speed of heat transfer between the two parts is faster; heat generated by the anode target 300 can be carried away quickly, and it is thereby possible to increase the service life of the anode target 300 while increasing the X-ray emission quantity. Thus, the X-ray generating apparatus provided according to some embodiments of the present disclosure can employ a dual-cathode structure, increasing the scanning speed to about twice that in the related art. At the same time, the absorbed dose of radiation of the person being scanned is reduced to about 75%.

According to another aspect of the present disclosure, an imaging device is provided, comprising a cooling system and an X-ray generating apparatus; the cooling system is in communication with the two ends of the heat-conducting member 200 of the X-ray generating apparatus, and the cooling system is used for conveying a cooling medium into the heat-conducting member 200.

The X-ray generating apparatus may have the structural form of any one of the embodiments described above. The imaging device may be a scanning device in which a medical CT machine can use X-rays for imaging. The cooling system may comprise a hydraulic pump and a heat exchanger; the hydraulic pump may be connected to the two ends of the heat-conducting member 200 by pipeline, thereby forming a cooling medium circulation pipeline, and the heat exchanger may undergo heat exchange with the cooling medium that has absorbed heat, thereby lowering the temperature of the cooling medium, so that the cooling medium can be re-conveyed into the through-channel 210.

Optionally, the imaging device is also provided with a gas extraction apparatus, which may be in communication with the gas discharge tube 700, to extract air from the accommodating cavity, forming a vacuum in the accommodating cavity and increasing the speed of electron bombardment.

Optionally, the imaging device may also have a high-voltage generator, which may be connected to the first cathode 400, to form a high voltage between the first cathode 400 and the anode target 300. It will be understood that the anode target 300 may be energized and may also be grounded.

In addition, to display images in a visually direct fashion, the imaging device may also be provided with a display that can display acquired images.

In the imaging device provided in some embodiments of the present disclosure, the heat-conducting member 200 of the X-ray generating apparatus is configured as a structure running through the anode target 300 and the casing 100, with the through-channel 210 being provided in the interior of the heat-conducting member 200, and the cooling medium being able to carry away heat from the anode target 300 through the through-channel 210; as a result, the heat dissipation efficiency of the X-ray generating apparatus is increased, the service life of the X-ray generating apparatus is improved, and the service life and operating stability of the imaging device are increased.

The above are merely embodiments of the present disclosure, which are not intended to limit it. Any amendments, equivalent substitutions or improvements, etc., made within the spirit and principles of the present disclosure shall be included in the scope of protection thereof.

The invention claimed is:

1. An X-ray generation apparatus, comprising:

a casing;

a heat-conduction member arranged through the casing, and having a through-channel configured to circulate a cooling medium; and an anode target configured to receive electron bombardment to generate X-rays, arranged in the casing, and surrounding the heat-conduction member in a rotatable fashion;

a first cathode connected to the casing, wherein the casing has a first transmission part, and the first cathode is arranged to correspond to the anode target so that electrons produced by the first cathode bombard the anode target in order to generate X-rays, and the X-rays exit the casing through the first transmission part; and a second cathode connected to the casing, wherein the casing also has a second transmission part, and the second cathode is arranged to correspond to the anode target so that electrons produced by the second cathode bombard the anode target in order to generate X-rays, and the X-rays exit the casing through the second transmission part.

2. The X-ray generation apparatus of claim 1, further comprising:

a first bearing surrounding the heat-conduction member and being located at a first end of the anode target, wherein an inner ring of the first bearing is connected in a fixed manner to the heat-conduction member, and an outer ring of the first bearing is connected in a fixed manner to the anode target, and a gap located between an inner surface of the anode target and the heat-conduction member.

3. The X-ray generation apparatus of claim 2, further comprising:

a second bearing surrounding the heat-conduction member and being located at a second end of the anode target facing away from the first bearing, wherein an inner ring of the second bearing is connected in a fixed manner to the heat-conduction member, and an outer ring of the second bearing is connected in a fixed manner to the anode target.

4. The X-ray generation apparatus of claim 3, wherein the first bearing, the anode target, and the second bearing are arranged in sequence in a direction of emission of the X-rays, the first bearing is a double row bearing, and the second bearing is a single row bearing.

5. The X-ray generation apparatus of claim 2, further comprising:

a rotor configured to cause the anode target to rotate, wherein the rotor surrounds the first bearing, and is connected in a fixed manner to the outer ring of the first bearing.

6. The X-ray generation apparatus of claim 1, further comprising:

a third bearing provided between the anode target and the heat-conduction member, wherein an outer ring of the third bearing is connected in a fixed manner to an inner surface of the anode target, and an inner ring of the third bearing is connected in a fixed manner to an outer surface of the heat-conduction member.

7. The X-ray generation apparatus of claim 6, wherein the third bearing comprises a liquid metal bearing.

8. The X-ray generation apparatus of claim 6, further comprising:

a rotor, which is configured to cause the anode target to rotate, surrounds the heat-conduction member, wherein the rotor and the third bearing are arranged in sequence in a direction of emission of the X-rays, and an end face of the rotor is connected in a fixed manner to an end face of the outer ring of the third bearing.

9. The X-ray generation apparatus of claim 1, wherein:

the heat-conduction member comprises a first segment, a second segment, and a transitional segment, and the second segment, the transitional segment, and the first segment are connected in sequence in a direction of emission of the X-rays, taking a plane perpendicular to an axis of the heat-conduction member as a cross-section, a cross-sectional peripheral dimension of the first segment is smaller than a cross-sectional peripheral dimension of the second segment, and a cross-sectional peripheral dimension of the transitional segment gradually increases from an end close to the first segment to an end close to the second segment, and the anode target surrounds the second segment.

10. The X-ray generation apparatus of claim 1, wherein the anode target gradually decreases in size in a direction of emission of the X-rays.

11. The X-ray generation apparatus of claim 1, wherein the second cathode and the first cathode are arranged symmetrically with respect to a rotation axis of the anode target.

12. The X-ray generation apparatus of claim 1, wherein:

the casing comprises a housing and a cover, the housing comprises a bottom wall and a sidewall connected to the bottom wall, and the bottom wall and the sidewall together enclose an accommodating cavity having an opening, the cover covers the opening and is arranged opposite the bottom wall, the anode target is arranged in the accommodating cavity, the first cathode is connected to the sidewall, and at least a part of the first cathode is located in the accommodating cavity, the first transmission part is arranged on the cover, and the heat-conduction member is arranged to run through the cover and the bottom wall.

13. An imaging device, comprising:

a cooling system; and the X-ray generation apparatus of claim 1, wherein the cooling system is in communication with two ends of the heat-conduction member of the X-ray generation apparatus, and is configured to convey a cooling medium into the heat-conduction member.

* * * * *